United States Patent
Tomita et al.

(10) Patent No.: US 10,458,623 B2
(45) Date of Patent: Oct. 29, 2019

(54) OPTICAL DEVICE COMPRISING LIGHT REFLECTION FILM

(71) Applicant: Panasonic Corporation, Osaka (JP)

(72) Inventors: Shogo Tomita, Hyogo (JP); Taku Hirasawa, Kyoto (JP)

(73) Assignee: Panasonic Corporation, Osaka (JP)

(*) Notice: Subject to any disclaimer, the term of this patent is extended or adjusted under 35 U.S.C. 154(b) by 115 days.

(21) Appl. No.: 15/888,180

(22) Filed: Feb. 5, 2018

(65) Prior Publication Data

US 2018/0245772 A1 Aug. 30, 2018

(30) Foreign Application Priority Data

Feb. 28, 2017 (JP) .................. 2017-036977
Sep. 13, 2017 (JP) .................. 2017-175612

(51) Int. Cl.
*F21V 7/30* (2018.01)
*F21K 9/64* (2016.01)
*G02B 5/08* (2006.01)

(52) U.S. Cl.
CPC .................. *F21V 7/30* (2018.02); *F21K 9/64* (2016.08); *G02B 5/0858* (2013.01)

(58) Field of Classification Search
CPC ............ F21K 9/64; F21V 7/30; G02B 5/0858
See application file for complete search history.

(56) References Cited

U.S. PATENT DOCUMENTS

| 4,020,389 A * | 4/1977 | Dickson ................. H05B 33/22 315/246 |
| 2001/0004188 A1 * | 6/2001 | Jacobsen ................. H01J 29/28 313/461 |
| 2004/0119400 A1 * | 6/2004 | Takahashi .............. C09K 11/02 313/504 |
| 2006/0066939 A1 * | 3/2006 | Kimura .................. G02B 26/02 359/321 |
| 2014/0368766 A1 | 12/2014 | Shibata et al. |
| 2016/0069538 A1 | 3/2016 | Chang et al. |
| 2016/0087159 A1 * | 3/2016 | Kim ........................ H01L 33/46 257/98 |

(Continued)

FOREIGN PATENT DOCUMENTS

| JP | 2012-064484 | 3/2012 |
| JP | 2012-226986 | 11/2012 |

(Continued)

*Primary Examiner* — Marcus H Taningco
(74) *Attorney, Agent, or Firm* — McDermott Will & Emery LLP

(57) ABSTRACT

An optical device comprises: a light reflection film which includes a metal layer and a dielectric layer on the metal layer; and a phosphor layer which is located on the dielectric layer and which emits light by being excited by light from a light source. The dielectric layer is located between the metal layer and the phosphor layer. A first wavelength, at which a reflectivity of light vertically incident on the light reflection film from the phosphor layer is highest, is longer than a centroid wavelength of an emission spectrum of the phosphor layer. The dielectric layer has a layered structure comprising a plurality of layers composed of at least two but no more than six layers. Refractive indexes of any two adjacent layers of the plurality of layers are different from each other.

17 Claims, 11 Drawing Sheets

(56) References Cited

U.S. PATENT DOCUMENTS

2016/0102820 A1\* 4/2016 Chang ..................... F21K 9/64
                                                        362/84
2017/0084784 A1\* 3/2017 Goshonoo ............... H01L 33/32

FOREIGN PATENT DOCUMENTS

| JP | 2015-050124 | 3/2015 |
| JP | 2015-084000 | 4/2015 |
| JP | 2016-058378 | 4/2016 |

\* cited by examiner

OPTICAL DEVICE COMPRISING LIGHT REFLECTION FILM

BACKGROUND

1. Technical Field

The present disclosure relates to an optical device.

2. Description of the Related Art

Due to the need for energy saving and an increase in longevity, an optical device using a solid state light source has received attention in recent years. A high-efficiency phosphor device with combination of a solid state light source, such as a laser diode (LD) or a light emitting diode (LED), and a phosphor has been developed.

For enhancement of the efficiency of a phosphor device, a reflection type apparatus has been proposed in which an excitation light source and a phosphor layer are spatially separated to curb a rise in temperature of the phosphor layer. For example, Japanese Unexamined Patent Application Publication No. 2012-64484 discloses an apparatus of the reflection type. The reflection type phosphor device includes a reflection layer between a phosphor layer and a substrate. Light emitted from the phosphor layer excited by excitation light is reflected by the reflection layer and is utilized. In the configuration in Japanese Unexamined Patent Application Publication No. 2012-64484, an aluminum flat plate is used as the substrate, and silver is used for the reflection layer. Japanese Unexamined Patent Application Publication No. 2016-058378 discloses a configuration using a metal film of, for example, silver or aluminum as a reflection layer.

SUMMARY

One non-limiting and exemplary embodiment provides a new technique for increasing the efficiency of an optical device by efficiently reflecting light emitted from a phosphor layer.

In one general aspect, the techniques disclosed here feature an optical device including: a light reflection film which includes a metal layer and a dielectric layer on the metal layer; and a phosphor layer which is located on the dielectric layer and which emits light by being excited by light from a light source. A wavelength, at which a reflectivity of light vertically incident on the light reflection film from the phosphor layer is highest, is longer than a centroid wavelength of an emission spectrum of the phosphor layer. The dielectric layer has a layered structure comprising a plurality of layers composed of at least two but no more than six layers, and refractive indexes of any two adjacent layers of the plurality of layers are different from each other.

It should be noted that general or specific embodiments may be implemented as a device, a system, a method, an integrated circuit, a computer program, a storage medium, or any selective combination thereof.

According to the technique of the present disclosure, the efficiency of an optical device can be increased by efficiently reflecting light emitted from a phosphor layer.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
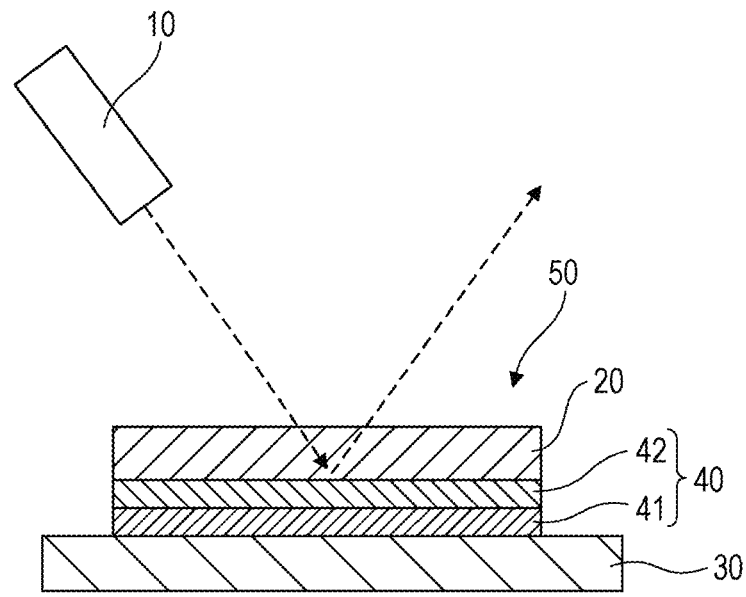
FIG. 1 is a view showing an example of the configuration of an optical device according to the present embodiment.

DETAILED DESCRIPTION (Underlying Knowledge Forming Basis of the Present Disclosure)

The underlying knowledge forming the basis of the present disclosure will be described before an embodiment of the present disclosure is described.

In the present specification, the term "light" refers to electromagnetic waves in the ultraviolet range and in the infrared range in addition to visible light. More specifically, electromagnetic waves having wavelengths not less than about 10 nm and not more than about 1 mm are referred to as "light".

Japanese Unexamined Patent Application Publication No. 2016-058378 discloses a configuration which includes a metal material as a reflection layer and also includes a distributed Bragg reflector (DBR) or an omnidirectional reflector (ODR). However, if a DBR is formed on a metal layer, effects of interference appear in a reflection spectrum, and the reflectivity drops significantly at a certain wavelength. For this reason, it is difficult to adjust the reflectivity to about 100% over an entire wavelength region from 400 nm to 700 nm, and the efficiency of an optical device cannot be enhanced.

If a dielectric multilayer film is employed as a reflection layer, a reflection spectrum shifts to a short wavelength side, and the reflectivity decreases gradually, depending on the angle of incidence. In an optical device (to be described later) according to the present disclosure in which a reflection layer is provided immediately below a phosphor layer, a dielectric multilayer film is unsuitable as the reflection layer.

It is common to design a phosphor device such that a centroid wavelength of an emission spectrum of a phosphor coincides with a wavelength at which a reflection spectrum of light vertically incident on a reflection layer is highest, at the time of phosphor device fabrication. The centroid wavelength is the weighted average of wavelengths obtained using the emission spectrum as weights. In other words, the centroid wavelength means a value obtained by calculating the product of each wavelength of light emitted from the phosphor and a light intensity for the wavelength over the entire emission wavelength region and dividing the sum of the products by the sum of the light intensities for the entire emission wavelength region. The centroid wavelength may also be referred to as an "average wavelength". If light from an excitation light source (hereinafter also referred to as "excitation light") is utilized in addition to light emitted by the phosphor, it is common to design such that a centroid wavelength obtained with inclusion of the excitation light coincides with the wavelength, at which a reflection spectrum of vertically incident light is highest. A peak wavelength may be used instead of the centroid wavelength.

In metal, a reflection characteristic has little angular dependence. Thus, if a metal layer is used as a reflection layer, the efficiency of a phosphor device is maximized by the above-described design.

In contrast, in a dielectric layer, a reflection characteristic has angular dependence. Thus, if an enhanced reflection film includes a dielectric layer, a reflection characteristic in the enhanced reflection film has angular dependence. According to examination by the present inventors, the amount of light incident from a phosphor on a reflection layer increases with an increase in angle of incidence. For this reason, a reflection characteristic for light incident on a reflection layer at a large angle contributes significantly to the efficiency of a phosphor device. A conventional phosphor device, however, is not designed in view of the angular dependence of a reflection characteristic of a dielectric layer. The present inventors have found that a light reflection film is desirably designed in view of the angular dependence of a reflection characteristic to increase the efficiency of a phosphor device.

The present inventors have arrived at aspects of the present disclosure to be described below on the basis of the above-described underlying knowledge.

An optical device according to an aspect of the present disclosure includes: a light reflection film which includes a metal layer and a dielectric layer on the metal layer; and a phosphor layer which is located on the dielectric layer and which emits light by being excited by light from a light source. The dielectric layer is located between the metal layer and the phosphor layer. A wavelength, at which a reflectivity of light vertically incident on the light reflection film from the phosphor layer is highest, is longer than a centroid wavelength of an emission spectrum of the phosphor layer. The dielectric layer has a layered structure comprising a plurality of layers composed of at least tow but no more than six layers, and refractive indexes of any two adjacent layers of the plurality of layers are different from each other.

An optical device according to another aspect of the present disclosure includes: a light reflection film which includes a metal layer and a dielectric layer on the metal layer; and a phosphor layer which is located on the dielectric layer and which emits light by being excited by light from a light source. The dielectric layer is located between the metal layer and the phosphor layer. A wavelength, at which a reflectivity of light vertically incident on the light reflection film from the phosphor layer is highest, is longer than a centroid wavelength of an optical spectrum, the optical spectrum being a combination of an emission spectrum of the light source and an emission spectrum of the phosphor layer. The dielectric layer has a layered structure including a plurality of layers composed of at least two but no more than six layers, and refractive indexes of any two adjacent layers of the plurality of layers are different from each other.

With the above-described configurations, the efficiency of an optical device can be increased, as will be described later.

A more specific embodiment of the present disclosure will be described below. Note that unnecessarily detailed descriptions may be omitted. For example, detailed descriptions of well-known matters and duplicate descriptions of substantially the same components may be omitted. Such omissions are intended to prevent the following description from being unnecessarily redundant and to facilitate understanding by those skilled in the art. Note that the inventors provide the accompanying drawings and the following description not to limit the subject matter defined in the claims but to allow those skilled in the art to fully understand the present disclosure. Components having same or similar functions are denoted by same reference numerals in the following description.

Embodiment

An optical device according to the present embodiment includes a light reflection film and a phosphor layer. Light reflection film includes a metal film and a dielectric layer. The dielectric layer is arranged on the metal film. The phosphor layer is arranged on the dielectric layer. The phosphor layer emits light by being excited by light from a light source. A wavelength, at which a reflectivity of light vertically incident on the light reflection film from the phosphor layer is highest, is longer than a centroid wavelength of an emission spectrum of the phosphor layer. Alternatively, the wavelength, at which a reflectivity of light vertically incident on the dielectric layer is highest, is longer than a centroid wavelength of an optical spectrum including both an emission spectrum of the light source and the emission spectrum of the phosphor layer. The dielectric layer has a layered structure including a plurality of layers composed of at least two but no more than six layers, and refractive indexes of any adjacent two of the plurality of layers in the dielectric layer are different from each other.

With the above-described configuration, light emitted from the phosphor layer can be efficiently reflected, and the efficiency of the optical device can be increased.

FIG. 1 is a view showing an example of the configuration of an optical device 50 according to the present embodiment. The optical device 50 includes a substrate 30, a light reflection film 40 on the substrate 30, and a phosphor layer 20. The light reflection film 40 includes a metal layer 41 and a dielectric layer 42. The substrate 30, the metal layer 41, the dielectric layer 42, and the phosphor layer 20 are stacked in this order. The substrate 30 supports the metal layer 41. The dielectric layer 42 is arranged on the metal layer 41. The phosphor layer 20 is arranged on the dielectric layer 42. The phosphor layer 20 emits light by being excited by light from a light source 10.

<Basic Configuration of Light Reflection Film>

A basic configuration of the light reflection film 40 including the metal layer 41 and the dielectric layer 42 will be described. The dielectric layer 42 has a layered structure including a plurality of layers, the number of which is not less than 2 and not more than 6. The refractive indexes of any adjacent two of the plurality of layers in the dielectric layer 42 are different from each other. Note that the thickness of each of the layers of the layered structure is at least not less than 3 nm. Although the layered structure may include a layer having a thickness less than 3 nm, the layer is not included in the number of layers of the layered structure in that case. In this example, unlike a conventional DBR or a conventional dielectric multilayer film, the dielectric layer 42 has no periodic structure. Thus, in the dielectric layer 42, Bragg reflection due to a periodic structure does not occur, and reflection due to thin-film interference (to be described later) occurs. A layered structure made of a dielectric material generally has a higher reflectivity than a uniform medium having the same thickness and the same average refractive index as the layered structure. For this reason, in the present embodiment, a layered structure made of a dielectric material is used as the dielectric layer 42. In the following description, however, the dielectric layer 42 as a layered structure is approximated as a uniform medium for easy formulation.

Letting N be the total number of layers of the dielectric layer 42, and $d_i$ and $n_i$ (i=1, 2, ..., N) be the thickness and the refractive index of each of the layers, a total film thickness $d_B$ and an average refractive index $n_B$ are given by Expressions (1) and (2).

$$d_B = \sum_{i=1}^{N} d_i \tag{1}$$

$$n_B = \frac{\sum_{i=1}^{N} n_i d_i}{\sum_{i=1}^{N} d_i} \tag{2}$$

A reflection characteristic of the light reflection film 40 can be calculated in view of repeated thin-film interference in the dielectric layer 42.

Figure 2:
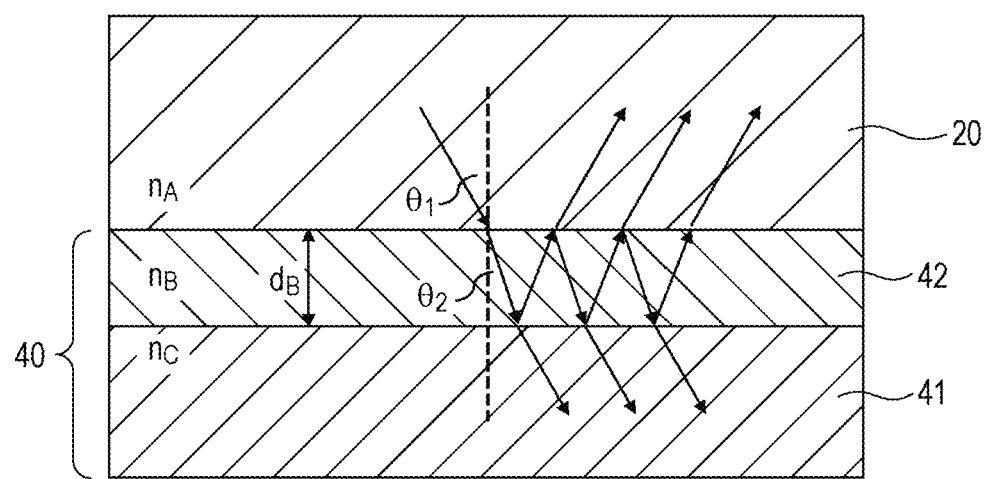
FIG. 2 is a view schematically showing that light emitted from a phosphor layer is incident on a dielectric layer and passes through or is reflected by the dielectric layer.

FIG. 2 is a view schematically showing that light emitted from the phosphor layer 20 is incident on the dielectric layer 42 and passes through or is reflected by the dielectric layer 42. Let $n_A$ be the refractive index of the phosphor layer 20 (medium 1), $n_B$ be the average refractive index of the dielectric layer 42 (medium 2), and $n_C$ be the refractive index of the metal layer 41 (medium 3). Let dB be the thickness of the dielectric layer 42. Let $\theta_1$ be an angle of incidence when light emitted from the phosphor layer 20 is incident on the dielectric layer 42, and $\theta_2$ be an angle of refraction. Let $r_{ij}$ (i, j=1, 2, 3 (i≠j)) be an amplitude reflectivity when light is incident from medium i on medium j. A reflectivity R is given by Expression (3) derived from the use of the Fresnel's formulas.

$$R = \frac{r_{12}^2 + r_{23}^2 + r_{12}r_{23}\cos\Delta_2}{1 + r_{12}^2 r_{23}^2 + r_{12}r_{23}\cos\Delta_2} \tag{3}$$

$\Delta_2$ represents a phase difference caused when light makes one round trip in the dielectric layer 42. $\Delta_2$ is given by Expression (4) derived from the use of a light wavelength $\lambda$.

$$\Delta_2 = \frac{4\pi n_B d_B \sqrt{1 - \left(\frac{n_A \sin\theta_1}{n_B}\right)^2}}{\lambda} \tag{4}$$

Letting $\lambda_r$ be a wavelength at which a reflectivity of the light reflection film 40 has a maximum value, the wavelength $\lambda_r$ is derived from an interference condition ($\Delta_2 = \pi$) and given by Expression (5).

$$\lambda_r = 4 n_B d_B \sqrt{1 - \left(\frac{n_A \sin\theta_1}{n_B}\right)^2} \tag{5}$$

Expression (5) shows that the wavelength $\lambda_r$ shifts to a short wavelength side with an increase in the angle $\theta_1$ of incidence.

Let $\lambda_0$ be a wavelength at which the reflectivity of the light reflection film 40 has a maximum value when the angle of incidence of light is 0°, that is, when the light is incident thereon vertically. Let $\lambda_{90}$ be a wavelength at which the reflectivity of the light reflection film 40 has a maximum value when the angle of incidence of light is 90°, that is, when the light is incident thereon horizontally. Expressions (6) and (7) are derived from Expression (5). Note that although there cannot be an angle of incidence of 90° (that is, horizontal incidence), the case means a case where calculation is performed on the basis of the assumption that the angle of incidence is 90° for ease of explanation.

$$\lambda_0 = 4n_B d_B \tag{6}$$

$$\lambda_{90} = \lambda_0 \sqrt{1 - \left(\frac{n_A}{n_B}\right)^2} \tag{7}$$

<Dependence of Amount of Incident Light on Angle of Incidence>

Figure 3:
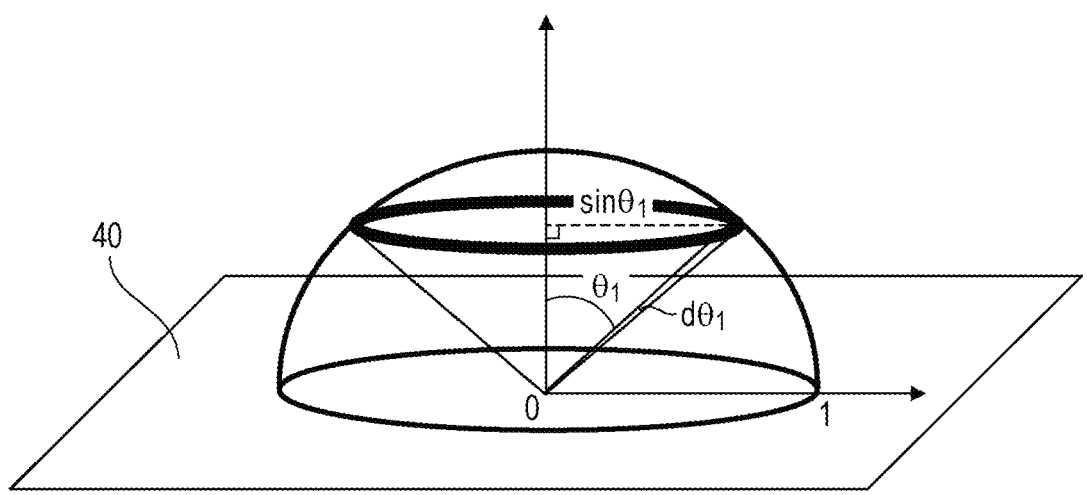
FIG. 3 is a view for explaining the dependent relationship between the amount of light incident on a light reflection film from a phosphor layer and angle of incidence.

FIG. 3 is a view for explaining the dependent relationship between the amount of light incident on the light reflection film 40 from the phosphor layer 20 and angle of incidence the dependence of the amount of light incident from the phosphor layer 20 on the light reflection film 40 on an angle of incidence. The radius of a hemisphere shown in FIG. 3 is 1. The phosphor layer 20 emits light in all directions. Thus, light emitted from the phosphor layer 20 is incident on the light reflection film 40 at every angle of incidence ($0° \leq \theta_1 \leq 90°$). Assume a case where light from the phosphor layer 20 is incident on the light reflection film 40 at the angle $\theta_1$ of incidence. The light from the phosphor layer 20 passes through a minute surface having a circumference of $2\pi \sin \theta_1$ and a width of $d\theta_1$. The area of the minute surface is $2\pi \sin \theta_1 d\theta_1$. Letting $R(\lambda, \theta_1)$ be the reflectivity of the light reflection film 40, reflection intensity when the light passing through the minute surface is reflected by the light reflection film 40 is proportional to $R(\lambda, \theta_1) \times 2\pi \sin \theta_1 d\theta_1$. A reflection intensity $Y(\lambda)$ of the light reflection film 40 with consideration for angular dependence is obtained by integrating $R(\lambda, \theta_1) \times 2\pi \sin \theta_1 d\theta_1$ over the range $0° \leq \theta_1 \leq 90°$ ($0 \leq \theta_1 \leq \pi/2$). $Y(\lambda)$ is given by Expression (8).

$$Y(\lambda) = \int_0^{\frac{\pi}{2}} R(\lambda, \theta_1) \times 2\pi \sin \theta_1 d\theta_1 \tag{8}$$

Expression (8) shows that the amount of light which is incident on the light reflection film 40 increases with an increase in the angle of incidence. That is, Expression (8) shows that a reflection characteristic of light at a larger angle of incidence contributes more to the efficiency of the optical device 50 than a reflection characteristic of light at a smaller angle of incidence.

<Performance Measure of Phosphor Device>

Let $I(\lambda)$ be an emission spectrum of the phosphor layer 20, and Z be a performance measure of the optical device 50. The performance measure Z of the optical device 50 can be calculated by integrating the product of the reflection intensity $Y(\lambda)$ of the light reflection film 40 with consideration for angular dependence and the emission spectrum $I(\lambda)$ of the phosphor layer 20. The performance measure Z of the optical device 50 is given by Expression (9).

$$Z = \int_{\lambda_i}^{\lambda_f} Y(\lambda) \times I(\lambda) d\lambda \tag{9}$$

$\lambda_i$ and $\lambda_f (\lambda_i < \lambda_f)$ represent wavelengths at two ends of the emission spectrum of the phosphor layer 20.

<Principle of Improvement in Energy Conversion Efficiency of Optical Device>

Reflectivities of the light reflection film 40 at large angles of incidence contribute largely to the energy conversion efficiency of the optical device 50. Let $\lambda_c$ be a centroid wavelength of the emission spectrum of the phosphor layer 20. and $R_{90}(\lambda)$ be a reflectivity of the light reflection film 40 for light of the wavelength $\lambda$ incident at an angle of incidence of 90°. The efficiency of the optical device 50 increases with an increase in a reflectivity $R_{90}(\lambda_c)$.

Figure 4A:
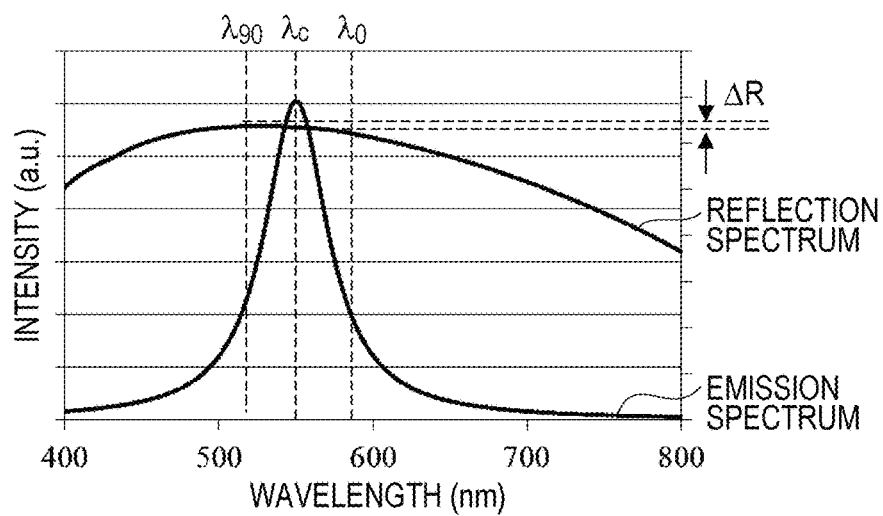
FIG. 4A is a chart showing a reflection spectrum of the light reflection film and an emission spectrum of the phosphor layer at an angle of incidence of 90° in a case where a difference ($\lambda_0$-$\lambda_c$) between a wavelength $\lambda_0$ and a wavelength $\lambda_c$ is smaller than a wavelength shift amount $\Delta\lambda$.
Figure 4B:
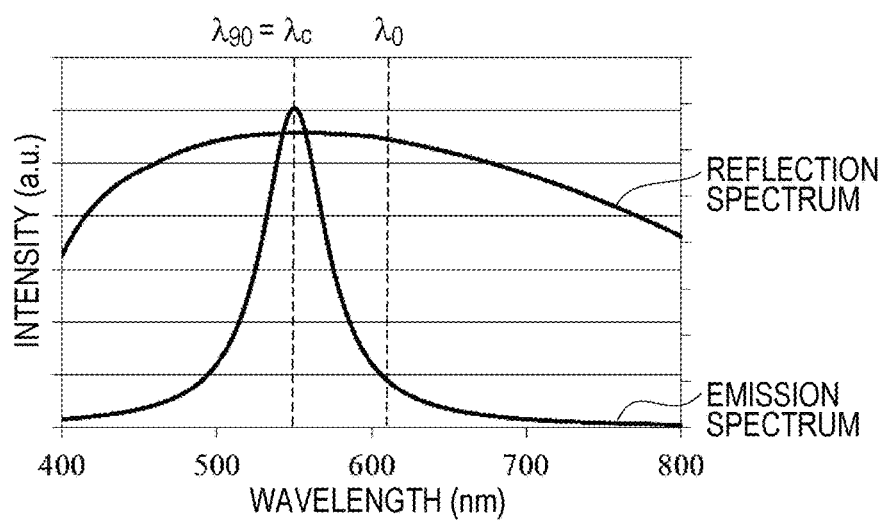
FIG. 4B is a chart showing a reflection spectrum of the light reflection film and an emission spectrum of the phosphor layer at the angle of incidence of 90° in a case where the difference ($\lambda_0$-$\lambda_c$) between the wavelength $\lambda_0$ and the wavelength $\lambda_c$ coincides with the wavelength shift amount $\Delta\lambda$.
Figure 4C:
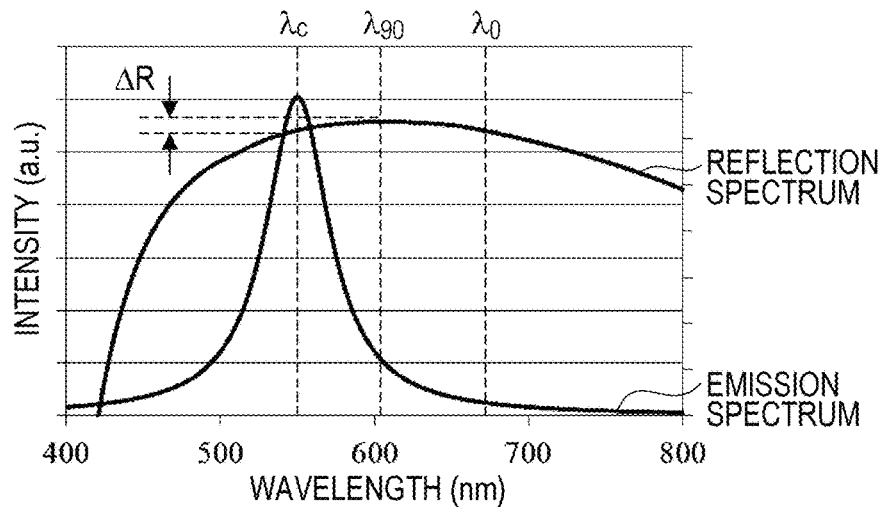
FIG. 4C is a chart showing a reflection spectrum of the light reflection film and an emission spectrum of the phosphor layer at the angle of incidence of 90° in a case where the difference ($\lambda_0$-$\lambda_c$) between the wavelength $\lambda_0$ and the wavelength $\lambda_c$ is larger than the wavelength shift amount $\Delta\lambda$.

FIGS. 4A to 4C are charts showing examples of a reflection spectrum of the light reflection film 40 and examples of an emission spectrum of the phosphor layer 20 for light incident at the angle of incidence of 90°. FIG. 4A shows an example in a case where a difference ($\lambda_0 - \lambda_c$) between the wavelength $\lambda_0$ and the wavelength $\lambda_c$ is smaller than a wavelength shift amount $\Delta\lambda (= \lambda_0 - \lambda_{90})$. FIG. 4B shows an example in a case where the difference ($\lambda_0 - \lambda_c$) between the wavelength $\lambda_0$ and the wavelength $\lambda_c$ coincides with the wavelength shift amount $\Delta\lambda$. FIG. 4C shows an example in a case where the difference ($\lambda_0 - \lambda_c$) between the wavelength $\lambda_0$ and the wavelength $\lambda_c$ is larger than the wavelength shift amount $\Delta\lambda$.

In the example in FIG. 4B, the wavelengths $\lambda_{90}$ and $\lambda_c$ coincide with each other ($\lambda_{90} = \lambda_c$). Thus, $R_{90}(\lambda_c) = R_{90}(\lambda_{90})$ holds. On the other hand, in the example in FIG. 4A, the wavelength $\lambda_{90}$ is closer to the short wavelength side than the wavelength $\lambda_c$, and $R_{90}(\lambda_c) < R_{90}(\lambda_{90})$ holds. As a result, the efficiency of the optical device 50 having a characteristic shown in FIG. 4A is lower than the efficiency of the optical device 50 having a characteristic shown in FIG. 4B. Similarly, in the example in FIG. 4C, the wavelength $\lambda_{90}$ is closer to a long wavelength side than the wavelength $\lambda_c$, and $R_{90}(\lambda_c) < R_{90}(\lambda_{90})$ holds. As a result, the efficiency of the optical device 50 having a characteristic shown in FIG. 4C is lower than the efficiency of the optical device 50 having the characteristic shown in FIG. 4B.

<Condition for Improvement in Luminous Efficiency>

Figure 5:
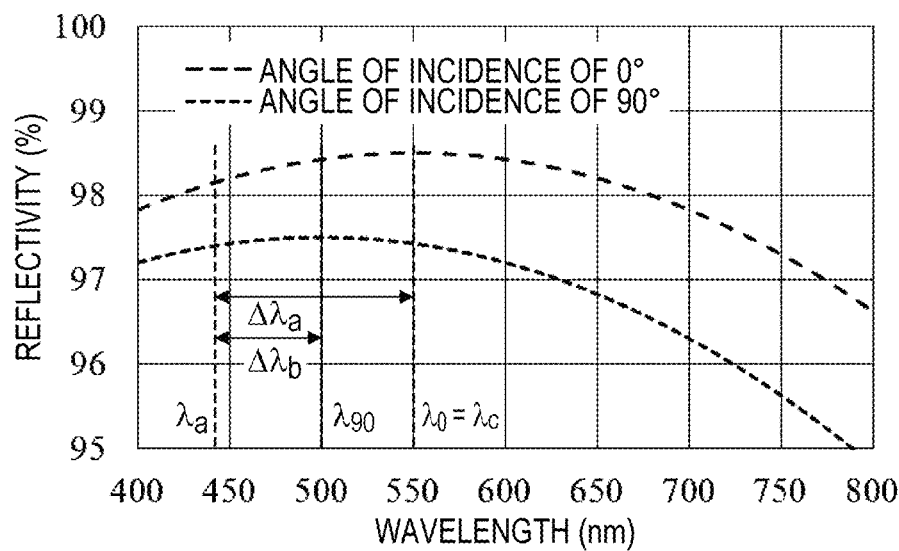
FIG. 5 is a chart showing a reflection spectrum of the light reflection film at an angle of incidence of 0° and a reflection spectrum of the light reflection film at the angle of incidence of 90° in a case where the wavelengths $\lambda_0$ and $\lambda_c$ are equal.

FIG. 5 is a chart showing an example of a reflection spectrum of the light reflection film 40 at an angle of incidence of 0° and an example of the reflection spectrum of the light reflection film 40 at the angle of incidence of 90° in a case where the wavelengths $\lambda_0$ and $\lambda_c$ are equal. In the example, the dielectric layer 42 is designed on the basis of a conventional design concept such that the wavelength $\lambda_0$, at which the reflectivity of the light reflection film 40 at the angle of incidence of 0° is highest, coincides with the centroid wavelength $\lambda_c$ of the emission spectrum of the phosphor layer 20. The reflectivity $R_{90}(\lambda_c)$ when light of the wavelength $\lambda_c$ is incident on the light reflection film 40 at the angle of incidence of 90° is lower than a peak value of a reflectivity in question.

Here, let $\lambda_a$ ($\lambda_a < \lambda_c$) be a different wavelength, a reflectivity at which is equal to the reflectivity $R_{90}(\lambda_c)$, and $\Delta\lambda_a(= \lambda_c - \lambda_a)$ be a difference between the wavelength $\lambda_c$ and the wavelength $\lambda_a$. If the reflection spectrum of the light reflection film 40 is entirely shifted to the long wavelength side by an amount smaller than $\Delta\lambda_a$, the reflectivity of light of the centroid wavelength $\lambda_c$ incident on the light reflection film 40 at the angle of incidence of 90° improves. For this reason, overall luminous efficiency can be expected to improve. This respect will be described in more detail below.

Since a reflectivity $R_{90}$ at the wavelength $\lambda_a$ and a reflectivity $R_{90}$ at the wavelength $\lambda_c$ are equal, Expression (10) is derived from Expression (3).

$$\cos \Delta_a = \cos \Delta_c \tag{10}$$

$\Delta_a$ and $\Delta_c$ represent phase differences at the wavelength $\lambda_a$ and the wavelength $\lambda_c$, respectively. Expression (11) is derived from Expression (10).

$$\Delta_a = \pm\Delta_c + 2m\pi \quad (m: \text{an integer}) \qquad (11)$$

Since $\lambda_c = \lambda_0$ and the angle $\theta_1$ of incidence=90°, $\Delta_c$ is derived from Expressions (4) and (6) and given by Expression (12).

$$\Delta_c = \pi\sqrt{1 - \left(\frac{n_A}{n_B}\right)^2} \qquad (12)$$

$\lambda_a$ is derived from Expressions (4), (6), (11), and (12) and given by Expression (13).

$$\lambda_a = \frac{\sqrt{1 - \left(\frac{n_A}{n_B}\right)^2}}{2m \pm \sqrt{1 - \left(\frac{n_A}{n_B}\right)^2}} \lambda_c \qquad (13)$$

The wavelength $\lambda_a$ has a maximum value among possible values in Expression (13). Thus, $\lambda_a$ is given by Expression (14).

$$\lambda_a = \frac{\sqrt{1 - \left(\frac{n_A}{n_B}\right)^2}}{2 - \sqrt{1 - \left(\frac{n_A}{n_B}\right)^2}} \lambda_c \qquad (14)$$

Letting $\Delta\lambda_a (=\lambda_c - \lambda_a)$ be the difference between the wavelength $\lambda_c$ and the wavelength $\lambda_a$, $\Delta\lambda_a$ is given by Expression (15).

$$\Delta\lambda_a = \frac{2\left(1 - \sqrt{1 - \left(\frac{n_A}{n_B}\right)^2}\right)}{2 - \sqrt{1 - \left(\frac{n_A}{n_B}\right)^2}} \lambda_c \qquad (15)$$

Letting $\Delta\lambda_b (=\lambda_{90} - \lambda_a)$ be a difference between $\lambda_{90}$ and $\lambda_a$, $\Delta\lambda_b$ is derived from Expressions (7) and (14) and given by Expression (16).

$$\Delta\lambda_b = \frac{\sqrt{1 - \left(\frac{n_A}{n_B}\right)^2}\left(1 - \sqrt{1 - \left(\frac{n_A}{n_B}\right)^2}\right)}{2 - \sqrt{1 - \left(\frac{n_A}{n_B}\right)^2}} \lambda_c \qquad (16)$$

Figure 6:
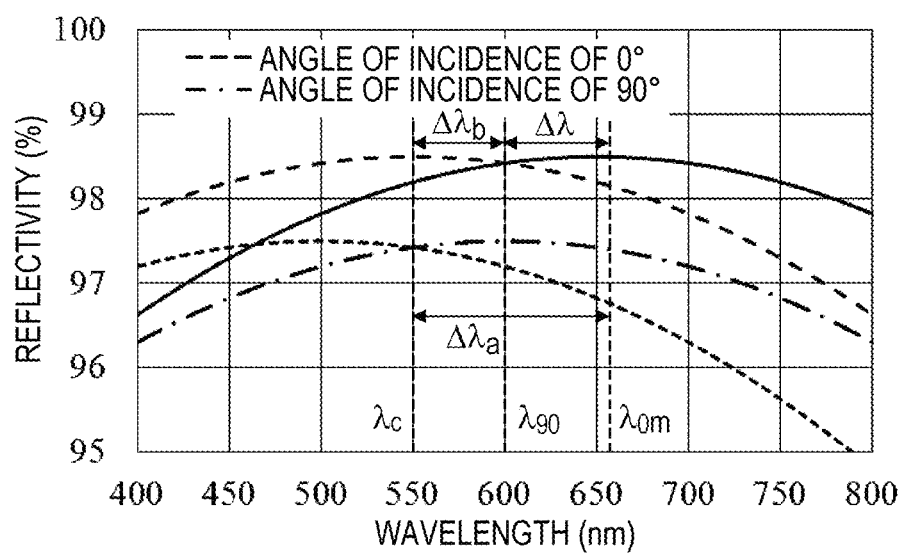
FIG. 6 is a chart showing a reflection spectrum of the light reflection film at the angle of incidence of 0° and a reflection spectrum of the light reflection film at the angle of incidence of 90° when the reflection spectra in the case where the wavelength $\lambda_0$ coincides with the wavelength $\lambda_c$ (see FIG. 5) are shifted to a long wavelength side by $\Delta\lambda_a$.

FIG. 6 is a chart showing a reflection spectrum of the light reflection film 40 at the angle of incidence of 0° and a reflection spectrum of the light reflection film 40 at the angle of incidence of 90° when the reflection spectra of the light reflection film 40 in the example shown in FIG. 5 are shifted to the long wavelength side by $\Delta\lambda_a$. For comparison, FIG. 6 also shows the two reflection spectra of the light reflection film 40 in FIG. 5. Let $\lambda_{0m}(=\lambda_c+\Delta\lambda_a)$ be a peak wavelength of the reflection spectrum at the angle of incidence of 0° in this case. If the wavelength $\lambda_0$, at which the reflectivity of light incident at 0° peaks, is longer than $\lambda_c$ and shorter than the wavelength $\lambda_{0m}$ in the actual device, the luminous efficiency can be expected to be made higher than in the example shown in FIG. 5. Thus, the wavelength $\lambda_{0m}$ can be regarded as an upper limit value of the wavelength $\lambda_0$. Since $\lambda_{0m} = \Delta\lambda_b + \Delta\lambda + \lambda_c$, the wavelength $\lambda_{0m}$ is given by Expression (17) derived from the use of Expressions (7) and (16).

$$\lambda_{0m} = \frac{1 + \left(\frac{n_A}{n_B}\right)^2}{2\sqrt{1 - \left(\frac{n_A}{n_B}\right)^2} - 1 + \left(\frac{n_A}{n_B}\right)^2} \lambda_c \qquad (17)$$

From the foregoing, if $\lambda_{0m}$ is regarded as the upper limit value of the wavelength $\lambda_0$, the range of $\lambda_0$ is given by Expression (18).

$$\lambda_c < \lambda_0 \leq \frac{1 + \left(\frac{n_A}{n_B}\right)^2}{2\sqrt{1 - \left(\frac{n_A}{n_B}\right)^2} - 1 + \left(\frac{n_A}{n_B}\right)^2} \lambda_c \qquad (18)$$

If the wavelength $\lambda_0$ falls within a wavelength range given by Expression (18), the energy conversion efficiency of the optical device 50 is equal to or higher than that when $\lambda_c = \lambda_0$.

A value of the wavelength $\lambda_0$ when the energy conversion efficiency of the optical device 50 is highest, that is, when $\lambda_c = \lambda_{90}$ holds may be regarded as the upper limit value of the wavelength $\lambda_0$. In this case, the range of $\lambda_0$ is given by Expression (19).

$$\lambda_c < \lambda_0 \leq \frac{\lambda_c}{\sqrt{1 - \left(\frac{n_A}{n_B}\right)^2}} \qquad (19)$$

The wavelength range of $\lambda_0$ given by Expression (19) is narrower than the wavelength range of $\lambda_0$ given by Expression (18).

A lower limit value of the wavelength $\lambda_0$ may be made larger than $\lambda_c$.

For example, let $\lambda_{10}$ be a wavelength at which a reflectivity at $\theta_1 = 10°$ peaks when the wavelength $\lambda_0 = \lambda_c$. A value $(2\lambda_c - \lambda_{10})$ obtained by adding a difference $(\lambda_0 - \lambda_{10})$ between $\lambda_0$ and $\lambda_{10}$ to the wavelength $\lambda_c$ may be regarded as the lower limit value of the wavelength $\lambda_0$. In this case, the range of $\lambda_0$ is given by Expression (20).

$$\lambda_0 \geq \left(2 - \sqrt{1 - \left(\frac{n_A \sin 10°}{n_B}\right)^2}\right)\lambda_c \qquad (20)$$

Similarly, let $\lambda_{30}$ be a wavelength at which a reflectivity at $\theta_1 = 30°$ peaks when the wavelength $\lambda_0 = \lambda_c$. A value $(2\lambda_c - \lambda_{30})$ obtained by adding a difference $(\lambda_0 - \lambda_{30})$ between $\lambda_0$ and $\lambda_{30}$ to the wavelength $\lambda_c$ may be regarded as the lower limit value of the wavelength $\lambda_0$. In this case, the range of $\lambda_0$ is given by Expression (21).

$$\lambda_0 \geq \left(2 - \sqrt{1 - \left(\frac{n_A \sin 30°}{n_B}\right)^2}\right) \lambda_c \qquad (21)$$

In Expression (18) or (19), a lower limit value of Expression (20) or (21) may be used instead of the lower limit value $\lambda_c$. In the optical device 50 according to the present embodiment, the dielectric layer 42 may be designed so as to, for example, satisfy Expression (18) or (19). Note that the present disclosure is not limited to this condition. In the present disclosure, the wavelength $\lambda_0$, at which the reflectivity of light vertically incident on the dielectric layer is highest, only needs to be longer than the centroid wavelength $\lambda_c$ of the emission spectrum of the phosphor layer 20.

A case where a conventional dielectric multilayer film having a periodic structure is formed on the metal layer 41 will next be described. The dielectric multilayer film is formed by, for example, alternately stacking two layers different in refractive index. In this case, the number of layers of the dielectric multilayer film with M periods is 2M. Hereinafter, a structure which has a small number of layers due to a small number of periods will also be referred to as a "dielectric multilayer film". In a dielectric multilayer film, Bragg reflection due to a periodic structure leads to achievement of a high reflectivity in a particular wavelength region. Any other wavelength region has a reflection peak due to thin-film interference (see, for example, FIG. 2) that may occur if the dielectric multilayer film is entirely thin.

Figure 7:
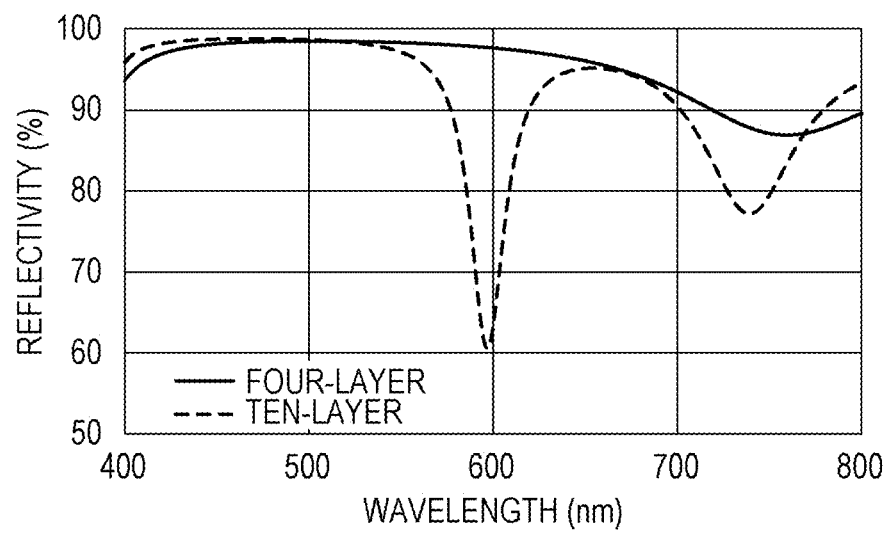
FIG. 7 is a chart showing results of simulating the reflectivity of the light reflection film at a given angle of incidence in a case where the light reflection film is a light reflection film (solid line) having a four-layer dielectric multilayer film formed on the metal layer and in a case where the light reflection film is a light reflection film (broken line) having a ten-layer dielectric multilayer film formed on the metal layer.

FIG. 7 is a chart showing results of simulating the reflectivity of the light reflection film 40 at the angle of incidence of 0° in a case where the light reflection film 40 is the light reflection film 40 (solid line) having a four-layer dielectric multilayer film formed on the metal layer 41 and in a case where the light reflection film 40 is the light reflection film 40 (broken line) having a ten-layer dielectric multilayer film formed on the metal layer 41. Four layers correspond to two periods, and ten layers correspond to five periods. The light reflection film 40 having the four-layer dielectric multilayer film formed on the metal layer 41 has a small number of periods, and Bragg reflection has little effect.

In the light reflection film 40 (solid line) having the four-layer dielectric multilayer film formed on the metal layer 41, a reflectivity is not less than 90% in a wavelength region from 400 nm to 700nm. In contrast, in the light reflection film 40 (broken line) having the ten-layer dielectric multilayer film formed on the metal layer 41, a reflectivity drops significantly near a wavelength of 600 nm due to thin-film interference. Thus, to curb a drop in reflectivity due to thin-film interference, the number of layers stacked on the metal layer 41 is desirably small. The number is particularly preferably not more than 6. The same applies to the dielectric layer 42 without a periodic structure. In the present specification, a structure having an extremely small number of periods, such as two periods, is regarded as the dielectric layer 42 without a periodic structure.

To improve the efficiency of the optical device 50, a reflectivity in the wavelength region from 400 nm to 700 nm is desirably high for every angle of incidence. For this reason, focus on the dependence of a dielectric multilayer film on an angle of incidence.

Figure 8:
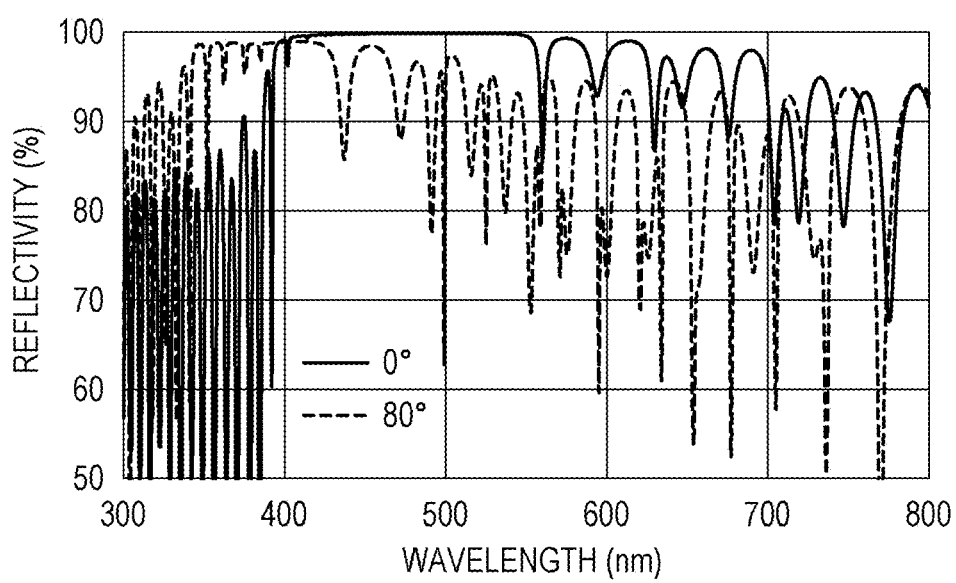
FIG. 8 is a chart showing results of simulating the reflectivity of the light reflection film having a 60-layer dielectric multilayer film formed on the metal layer.

FIG. 8 is a chart showing results of simulating the reflectivity of the light reflection film 40 having a 60-layer dielectric multilayer film formed on the metal layer 41. A solid line represents a reflectivity at the angle of incidence of 0° while a broken line represents a reflectivity at an angle of incidence of 80°. Sixty layers correspond to 30 periods. In the 60-layer dielectric multilayer film, remarkable Bragg reflection occurs.

In the case of the angle of incidence of 0°, the reflectivity is about 100% in a wavelength region from about 400 nm to 550 nm. The reflectivity of about 100% in the particular wavelength region is obtained due to Bragg reflection caused by the periodic structure. A plurality of reflection peaks in wavelength regions other than the wavelength region are obtained due to thin-film interference. On the other hand, in the case of the angle of incidence of 80°, a wavelength region where the reflectivity is about 100% shifts to the short wavelength side, and the width of the wavelength region is smaller.

For this reason, to achieve high reflectivities in the wavelength region from 400 nm to 700 nm for every angle of incidence, the width of a wavelength region with high reflectivities at the angle of incidence of 0° needs to be larger than the width of the wavelength region from 400 nm to 700 nm by the sum of the amount of shift in reflectivity and an amount by which the width of the wavelength region with high reflectivities decreases with the shift. The width of the wavelength region with high reflectivities at the angle of incidence of 0° may be, for example, not less than 500 nm. The high reflectivities need not be about 100% and may be not less than 80%.

Reflection spectra of the light reflection film 40 at large angles of incidence contribute largely to the efficiency of the optical device 50. For this reason, to enhance the efficiency, a peak wavelength of a reflection spectrum at a large angle of incidence (for example,)80° only needs to coincide with the centroid wavelength of the emission spectrum of the phosphor layer 20. The amount of shift in a peak wavelength of the reflection spectrum due to an increase in the angle of incidence also contributes to the efficiency of the optical device 50.

Figure 9A:
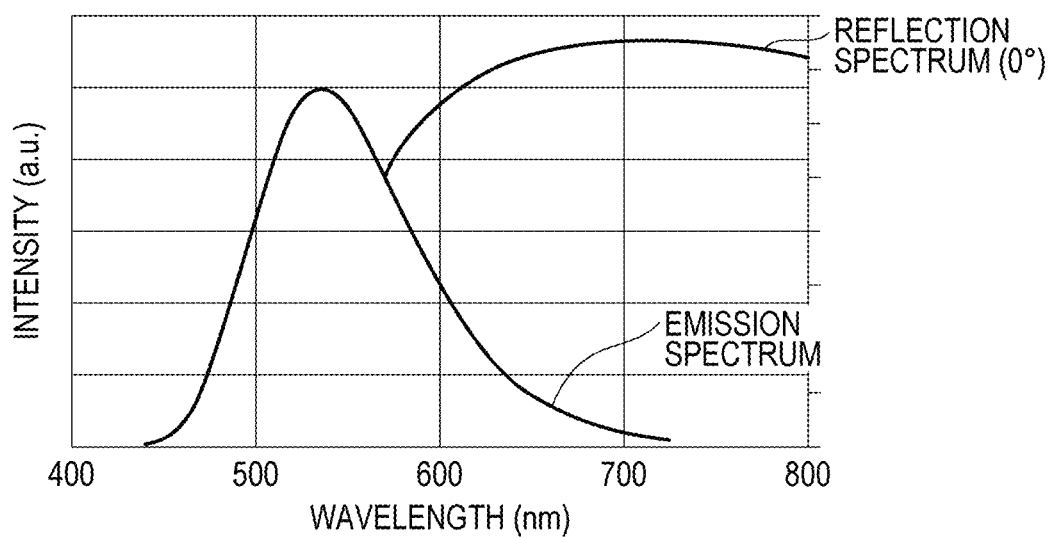
FIG. 9A is a chart schematically showing an example of a reflection spectrum of the light reflection film and an example of an emission spectrum of the phosphor layer at the angle of incidence of 0°.
Figure 9B:
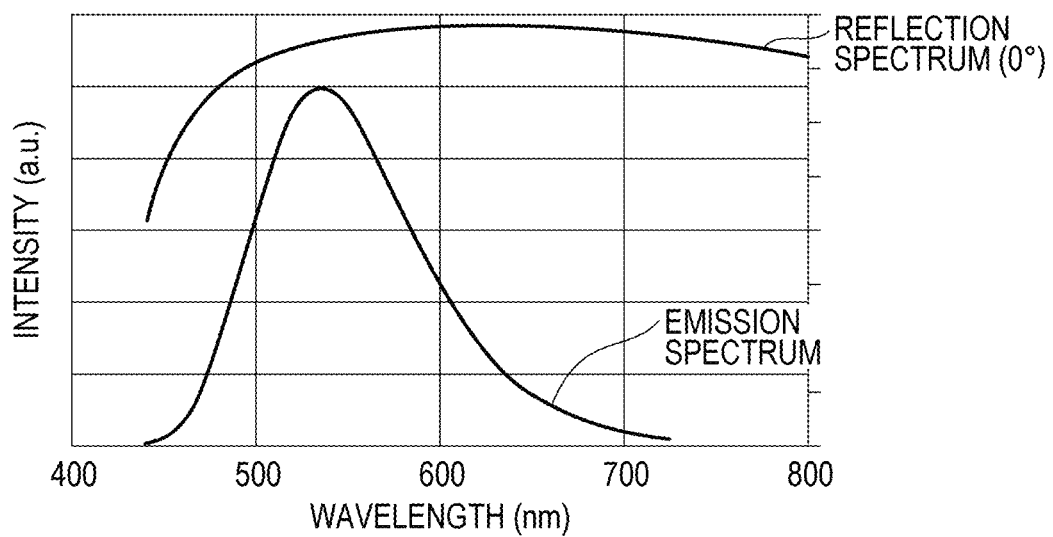
FIG. 9B is a chart schematically showing another example of the reflection spectrum of the light reflection film and another example of the emission spectrum of the phosphor layer at the angle of incidence of 0°.

FIG. 9A is a chart schematically showing an example of a reflection spectrum of the light reflection film 40 and an example of an emission spectrum of the phosphor layer 20 at the angle of incidence of 0°. FIG. 9B is a chart schematically showing another example of the reflection spectrum of the light reflection film 40 and another example of the emission spectrum of the phosphor layer 20 at the angle of incidence of 0°. Although not shown in FIGS. 9A and 9B, a peak wavelength of a reflection spectrum of the light reflection film 40 at the angle of incidence of 80° is designed so as to coincide with the centroid wavelength of the emission spectrum of the phosphor layer 20. Thus, a peak wavelength at which the reflectivity at the angle of incidence of 0° is highest is longer than a peak wavelength at which the reflectivity at the angle of incidence of 80° is highest.

In the example shown in FIG. 9A, the amount of shift in the peak wavelength of the reflection spectrum of the light reflection film 40 due to an increase in angle of incidence is larger, and an overlap integral of the emission spectrum of the phosphor layer 20 and the reflection spectrum of the light reflection film 40 is smaller. In contrast, in the example shown in FIG. 9B, the amount of shift in the peak wavelength of the reflection spectrum of the light reflection film 40 due to an increase in angle of incidence is smaller, and an overlap integral of the emission spectrum of the phosphor layer 20 and the reflection spectrum of the light reflection film 40 is larger.

To improve the efficiency of the optical device, the amount of shift in the peak wavelength of the reflection spectrum when the angle of incidence increases from 0° to 90° may be small. For example, a difference in peak wavelength between the angle of incidence of 0° and an angle of incidence of 45° is not more than 70 nm and may be not more than 40 nm in a certain example.

The amount of shift in the peak wavelength of the reflection spectrum tends to increase with an increase in the thickness of the dielectric layer 42 formed on the metal layer 41. For this reason, the thickness of the dielectric layer 42 can be set to a small value. The thickness of the dielectric layer 42 may be, for example, not more than 400 nm or not more than 200 nm.

The efficiency of the optical device 50 according to the present embodiment improves if the width of a wavelength region where a reflectivity of the light reflection film 40 at the angle of incidence of 0° is not less than 80% is large, the amount of shift in the peak wavelength of the reflection spectrum due to a change in angle of incidence is small, the number of layers of the dielectric layer 42 is small, and the thickness of the dielectric layer 42 is small.

<Component of Optical Device>

Components of the optical device 50 in FIG. 1 will be described in more detail below.

The light source 10 can be, for example, a solid state light source which emits light of a wavelength not more than 450 nm. For example, a light source, such as an LD or an LED, having an emission wavelength in a region from ultraviolet light to blue light can be used as the light source 10. The light source 10 emits excitation light toward the phosphor layer 20. In the example shown in FIG. 1, excitation light from the light source 10 enters the phosphor layer 20 through a surface (hereinafter referred to as an "upper surface") opposite to the side facing the dielectric layer 42. The light source 10 is arranged away from the phosphor layer 20, the light reflection film 40, and the substrate 30. This is to prevent a situation in which the phosphor layer 20 is heated by heat generated by the light source 10 to reduce the luminous efficiency. The light source 10 may include one or more lenses which focus emitted light in addition to a light emitting element, such as an LD or an LED.

A configuration in which excitation light from the light source 10 is caused to be incident on a surface on the dielectric layer 42 side of the phosphor layer 20 is also possible. A configuration in which excitation light is caused to be incident on a side surface of the phosphor layer 20 is also possible. In contrast, in the configuration, in which excitation light is caused to be incident on the upper surface of the phosphor layer 20, a distance between the light source 10 and the phosphor layer 20 is easy to secure. For this reason, it is easy to inhibit a fluorescence characteristic of the phosphor layer 20 from degrading due to heat generated by the light source 10.

The light source 10 may be a light source including a solid state laser. A solid state material, such as crystals or glass, doped with transition metal ions, rare-earth ions, or the like is used for the solid state laser. A solid state laser has a higher light collecting property than an LED. Thus, if the phosphor layer 20 is excited using the solid state laser, a luminous point of the phosphor layer 20 can be made small. To circumvent effects of heat generation, the solid state laser light source is arranged as far as possible from the phosphor layer 20.

The phosphor layer 20 receives excitation light emitted from the light source 10 and emits a fluorescence of a wavelength longer than the wavelength of the excitation light. Light emitted from the phosphor layer 20 has at least one peak, for example, in a wavelength region from 400 nm to 800 nm. The phosphor layer 20 may include a plurality of phosphor materials which emit lights, such as blue light, green light, yellow light, and red light. For example, $Sr_5(PO_4)_3Cl:Eu^{2+}$ (SCA), $BaMgAl_{10}O_{17}:Eu^{2+}$ (BAM), or the like can be used as a phosphor material which emits blue light. For example, $Lu_3Al_5O_{12}:Ce^{3+}$ (LuAG) or the like can be used as a phosphor material which emits green light. For example, a material containing YAG:Ce (cerium-doped yttrium aluminum garnet) can be used as a phosphor material which emits yellow light. More specifically, for example, $Y_3Al_5O_{12}:Ce^{3+}$ (YAG) or the like can be used. For example, $CaAlSiN_3:Eu^{2+}$ (CASN), $La_3Si_6N_{11}:Ce^{3+}$ (LSN), or the like can be used as a phosphor material which emits red light.

Light emission with a desired spectrum may be implemented by combining light emitted by the phosphor layer 20 and excitation light emitted by the light source 10. For example, white light emission may be implemented by combining the light source 10 that emits blue excitation light and the phosphor layer 20 that receives the excitation light and emits yellow light.

For example, phosphor powder dispersed in glass or resin, a glass phosphor having luminescent center ions added to a glass matrix, a phosphor ceramic, or the like can be used for the phosphor layer 20.

The thickness of the phosphor layer 20 is not particularly limited and may be designed so as to be, for example, not less than 1 μm and not more than 100 μm. By setting the thickness within such a range, heat can be inhibited from accumulating in the phosphor layer 20. This allows curbing of a drop in luminance.

A light emission surface of the phosphor layer 20, that is, a surface on which excitation light from the light source 10 is incident may be subjected to treatment for preventing reflection of excitation light, as needed. An antireflection film may be provided at the light emission surface.

The substrate 30 can also function as a heat dissipating board which transfers heat generated from the phosphor layer 20 to the outside. For this reason, the substrate 30 can be composed of, for example, a material having a high thermal conductivity characteristic.

For example, a metal material having a high reflectivity in a visible light region can be used for the metal layer 41. For example, a metal, such as aluminum (Al), silver (Ag), or gold (Au), or an alloy thereof (for example, an aluminum alloy, a silver alloy, or a gold alloy) can be used. That is, the metal layer 41 may contain at least one of silver, a silver alloy, aluminum, and an aluminum alloy. To enhance a reflectivity, for example, Ag or an Ag alloy is used.

The dielectric layer 42 includes, for example, a high refractive index material and a low refractive index material containing dielectric materials different in refractive index. The high refractive index material and the low refractive index material can be alternately stacked a plurality of times. The thicknesses of respective layers as dielectric thin films constituting the dielectric layer 42 can be, for example, about 1 nm to 100 nm. The total thickness of the dielectric layer 42 can be, for example, about 50 nm to 400 nm. For example, $MgF_2$ (n=1.38), $SiO_2$ (n=1.46), $Al_2O_3$ (n=1.77), or the like can be used as the low refractive index material. For example, $Ta_2O_5$ (n=2.20), $TiO_2$ (n=2.50), $Nb_2O_5$ (n=2.35), or the like can be used as the high refractive index material.

The light reflection film 40 includes the metal layer 41 and the dielectric layer 42 arranged on the metal layer 41. The light reflection film 40 reflects light emitted from the phosphor layer 20 and excitation light passing through the phosphor layer 20 toward the light emission surface of the phosphor layer 20. The light reflection film 40 is arranged between the phosphor layer 20 and the substrate 30. The reflection spectrum of the light reflection film 40 at the angle of incidence of 0° can have at least one peak, for example, in the wavelength region from 400 nm to 800 nm. The reflection spectrum may have a peak in any other wavelength region.

Figure 10:
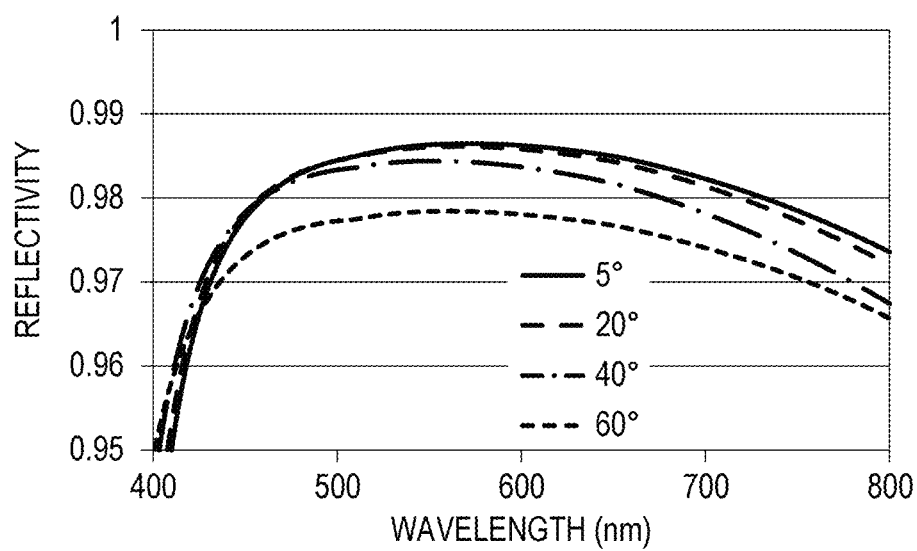
FIG. 10 is a chart showing reflection spectra of the light reflection film.

FIG. 10 is a chart showing an example of the reflection spectrum of the light reflection film 40. As shown in FIG. 10, in the light reflection film 40, the reflection characteristic has angular dependence. A peak in reflectivity of the reflection spectrum shifts to the short wavelength side with an increase in angle of incidence. In the reflection spectrum of the light reflection film 40, a wavelength at which the reflection spectrum has a peak value can vary by, for example, about 10 nm or more due to a change in angle of incidence from 0° to 90°. Effects of the embodiment of the present disclosure can be particularly noticeably obtained in the light reflection film 40 exhibiting such a wavelength shift.

<Comparison with Simulation Result>

The present inventors have confirmed by simulation that the efficiency of the optical device 50 is improved by providing the light reflection film 40 according to the present embodiment. In the present simulation, the performance measure Z of the optical device given by Expression (9) was calculated.

A result of the simulation will be described below. For the calculation, the following parameters were set. An Ag alloy (Ag—Pd—Cu) was used for the metal layer 41. The dielectric layer 42 was formed to have three layers ($TiO_2$—$SiO_2$—$Al_2O_3$) (see FIG. 17). The reflection spectrum of the light reflection film 40 was calculated by optical simulation using DiffractMOD that is diffractive optical element design and analysis software based on rigorous coupled-wave analysis (RCWA). In the calculation below of Expressions (18) and (19), $n_A=1.0$ and $n_B=2.05$ were used.

A result of a case using a YAG:Ce phosphor as a phosphor material will be described.

Figure 11:
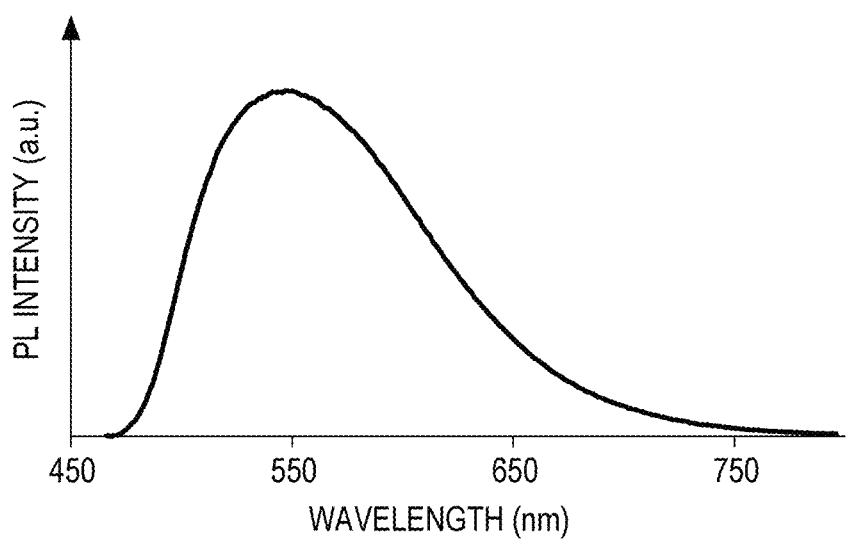
FIG. 11 is a chart showing an emission spectrum of a YAG:Ce phosphor.

FIG. 11 is a chart showing an example of an emission spectrum of the YAG:Ce phosphor. A centroid wavelength ($\lambda_c$) of the emission spectrum of the YAG:Ce phosphor is 565 nm.

Figure 12:
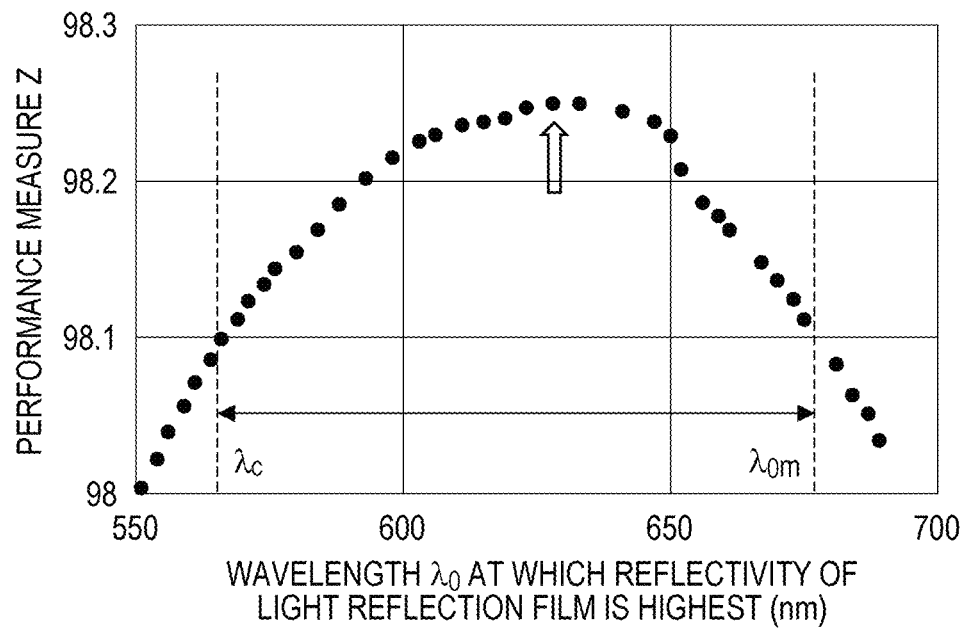
FIG. 12 is a chart showing a result of plotting a performance measure Z of the optical device calculated by Expression (9) while varying $\lambda_0$.

FIG. 12 is a chart showing a result of plotting the performance measure Z of the optical device calculated by Expression (9) while varying $\lambda_0$. As shown in FIG. 12, if the wavelength $\lambda_0$ is closer to the long wavelength side than the centroid wavelength of the emission spectrum of the YAG:Ce phosphor, the efficiency of the optical device is higher.

If the YAG:Ce phosphor is used as a phosphor material, the wavelength range of the wavelength $\lambda_0$ given by Expression (18) is 565 nm$<\lambda_0\leq$717 nm. The wavelength range of the wavelength $\lambda_0$ given by Expression (19) is 565 nm$<\lambda_0\leq$653 nm. The wavelength ranges of the wavelength $\lambda_0$ given by Expressions (20) and (21) are $\lambda_0\geq$567 nm and $\lambda_0\geq$582 nm, respectively.

As can be seen from the optical simulation result shown in FIG. 12, a wavelength range of $\lambda_0$ which improves the efficiency of the optical device 50 is 565 nm to 677 nm (a range indicated by a two-headed arrow in a lateral direction in FIG. 12). When $\lambda_0=$628 nm (indicated by an up arrow in FIG. 12), the efficiency of the optical device 50 is highest. Thus, $\lambda_0$ in this case falls within the ranges given by Expressions (18) and (19).

A result of a case using a $CaAlSiN_3$:Eu phosphor as a phosphor material will next be illustrated.

Figure 13:
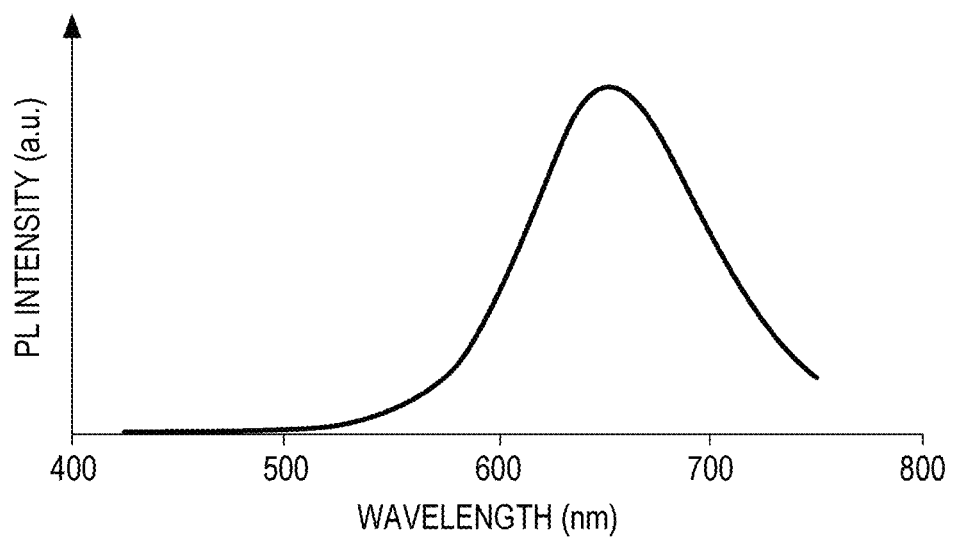
FIG. 13 is a chart showing an emission spectrum of a CaAlSiN$_3$:Eu phosphor.

FIG. 13 is a chart showing an emission spectrum of the $CaAlSiN_3$:Eu phosphor. A centroid wavelength ($\lambda_c$) of the emission spectrum of the $CaAlSiN_3$:Eu phosphor is 654 nm.

Figure 14:
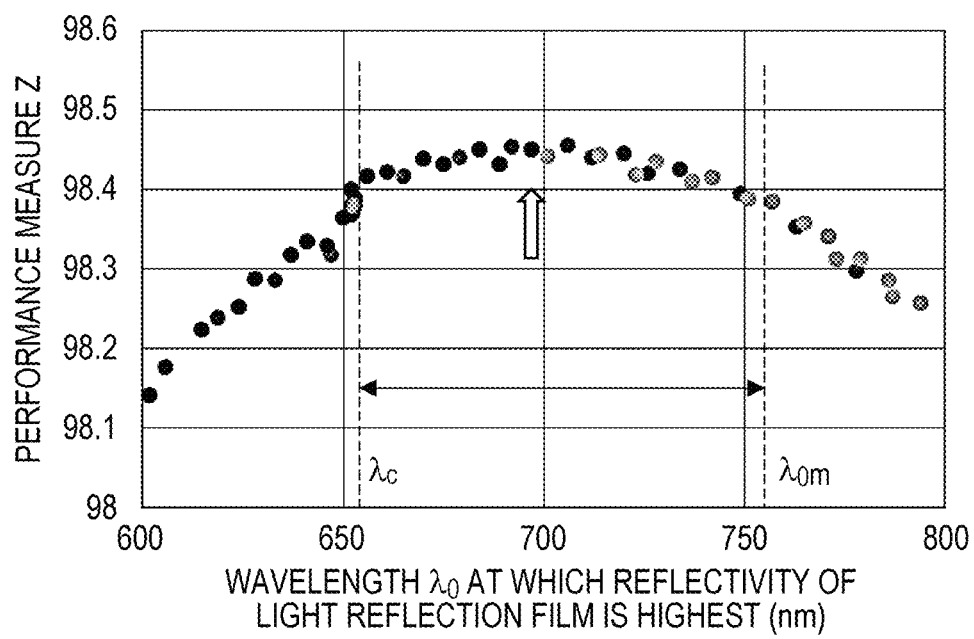
FIG. 14 is a chart showing a result of plotting the performance measure Z of the optical device calculated by Expression (9) while varying $\lambda_0$.

FIG. 14 is a chart showing a result of plotting the performance measure Z of the optical device calculated by Expression (9) while varying $\lambda_0$. As shown in FIG. 14, if the wavelength $\lambda_0$ is closer to the long wavelength side than the centroid wavelength of the emission spectrum of the $CaAlSiN_3$:Eu phosphor, the efficiency of the optical device is higher.

If the $CaAlSiN_3$:Eu phosphor is used as a phosphor material, the wavelength range of the wavelength $\lambda_0$ given by Expression (18) is 654 nm$<\lambda_0\leq$823 nm. The wavelength range of the wavelength $\lambda_0$ given by Expression (19) is 654 nm$<\lambda_0\leq$749 nm. The wavelength ranges of the wavelength $\lambda_0$ given by Expressions (20) and (21) are $\lambda_0\geq$656 nm and $\lambda_0\geq$674 nm, respectively.

As can be seen from the optical simulation result shown in FIG. 14, a wavelength range of $\lambda_0$ which improves the efficiency of the optical device is 654 nm to 757 nm (a range indicated by a two-headed arrow in a lateral direction in FIG. 14). When $\lambda_0=$697 nm (indicated by an up arrow in FIG. 14), the efficiency of the optical device is highest. Thus, $\lambda_0$ in this case falls within the ranges given by Expressions (18) and (19).

The phosphor layer 20 may contain a plurality of phosphor materials. A result of a case using a phosphor which is a combination of a SCA:Eu phosphor and a YAG:Ce phosphor as a phosphor material will be illustrated.

Figure 15:
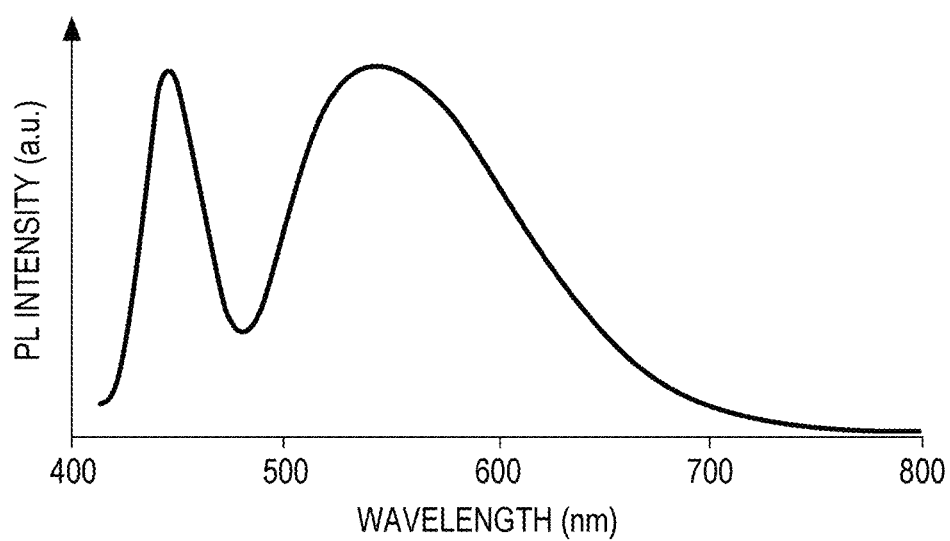
FIG. 15 is a chart showing an emission spectrum of a phosphor which is a combination of a SCA:Eu phosphor and a YAG:Ce phosphor.

FIG. 15 is a chart showing an emission spectrum of the phosphor that is the combination of the SCA:Eu phosphor and the YAG:Ce phosphor. A centroid wavelength ($\lambda_c$) of the emission spectrum of the phosphor that is the combination of the SCA:Eu phosphor and the YAG:Ce phosphor is 544 nm.

Figure 16:
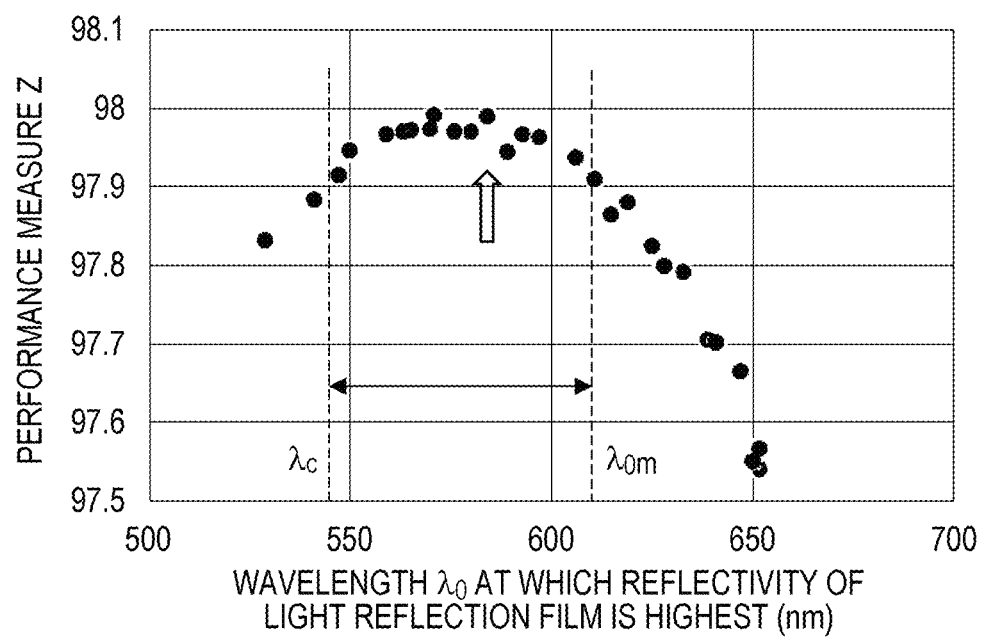
FIG. 16 is a chart showing a result of plotting the performance measure Z of the optical device calculated by Expression (9) while varying $\lambda_0$.

FIG. 16 is a chart showing a result of plotting the performance measure Z of the optical device calculated by Expression (9) while varying $\lambda_0$. As shown in FIG. 16, if the wavelength $\lambda_0$ is closer to the long wavelength side than the centroid wavelength of the emission spectrum of the phosphor that is the combination of the SCA:Eu phosphor and the YAG:Ce phosphor, the efficiency of the optical device is higher.

If the SCA:Eu phosphor and the YAG:Ce phosphor are combined as the phosphor material, the wavelength range of the wavelength $\lambda_0$ given by Expression (18) is 544 nm$<\lambda_0\leq$684 nm. The wavelength range of the wavelength $\lambda_0$ given by Expression (19) is 544 nm$<\lambda_0\leq$623 nm. The wavelength ranges of the wavelength $\lambda_0$ given by Expressions (20) and (21) are $\lambda_0\geq$546 nm and $\lambda_0\geq$560 nm, respectively.

As can be seen from the optical simulation result shown in FIG. 16, a wavelength range of $\lambda_0$ which improves the efficiency of the optical device is 544 nm to 611 nm (a range indicated by a two-headed arrow in a lateral direction in FIG. 16). When $\lambda_0=$584 nm (indicated by an up arrow in FIG. 16), the efficiency of the optical device is highest. Thus, $\lambda_0$ in this case falls within the ranges given by Expressions (18) and (19).

The adequacy of the ranges indicated by Expressions (18) and (19) was confirmed from the above-described simulation results.

In the above-described examples, only an emission spectrum of a phosphor layer was considered. The present embodiment is also useful for a case using an optical spectrum including both an emission spectrum of a light source and an emission spectrum of a phosphor layer. In this case, a centroid wavelength of the optical spectrum that is a combination of both the emission spectrum of the light source and the emission spectrum of the phosphor layer may be used as $\lambda_c$.

A reason why the optical simulation results do not agree with the results of calculating Expressions (18) and (19) will next be examined.

The calculation of Expressions (18) and (19) is based on the assumption that the efficiency of the optical device depends only on the reflectivity $R(\lambda,\theta_1)$ when $\theta_1=90°$ which contributes most to the efficiency of the optical device (see Expression (8)). In the optical simulations, the efficiency of the optical device depends not only on the reflectivity when $\theta_1=90°$ but also on a reflectivity when $\theta_1\neq 90°$, as indicated by Expression (8).

That is, the above-described assumption in the calculation of Expressions (18) and (19) causes a difference between the optical simulation results and the results of calculating Expressions (18) and (19). Nevertheless, Expressions (18) and (19) are effective in roughly estimating a wavelength range which enhances the efficiency of the optical device.

<Formation of Light Reflection Film>

A practical example of a method for manufacturing a light reflection film will be described. The present inventors experimentally made a light reflection film by the method below.

A metal layer was first formed on a mirror-finished substrate by sputtering. The material for the metal layer is an Ag alloy (Ag—Pd—Cu). The thickness of the metal layer was set to 150 nm. Films of $Al_2O_3$, $SiO_2$, and $TiO_2$ were sequentially formed by sputtering to form a dielectric layer on the metal layer. The thickness of the dielectric layer was set to 100 nm to 150 nm. Note that film formation is not limited to sputtering and may be performed by a method, such as vapor deposition.

<Reflection Spectrum of Light Reflection Film>

Figure 17:
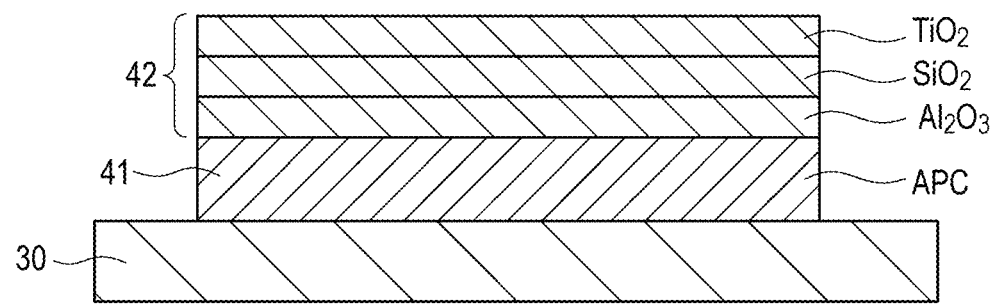
FIG. 17 is a view showing a practical example of the configuration of the light reflection film.

FIG. 17 shows a practical example of the configuration of the light reflection film. As shown in FIG. 17, the Ag alloy (Ag—Pd—Cu) was used as the metal layer 41, and the film thickness was set to 150 nm. The dielectric layer 42 formed on the metal layer 41 was formed to have a layered structure of $Al_2O_3$, $SiO_2$, and $TiO_2$.

Table 1 indicates the refractive index and the thickness of each of the dielectric thin films.

TABLE 1

| | Thin film material | | |
|---|---|---|---|
| | $Al_2O_3$ | $SiO_2$ | $TiO_2$ |
| Film refractive index | 1.77 | 1.46 | 2.50 |
| Film thickness (nm) | 5 | 50 | 70 |

In the example in FIG. 17, the dielectric thin films of $Al_2O_3$, $SiO_2$, and $TiO_2$ are stacked on the metal layer 41 in this order. In the dielectric layer 42 with a three-layer structure, the refractive index of the top layer in contact with an air layer is the highest, and the refractive index of the middle layer is the lowest. This is to enhance the reflectivity of the dielectric layer 42. The reflectivity of a layered structure generally tends to rise with an increase in a difference in refractive index between two adjacent layers. When dielectric thin films of $Al_2O_3$, $SiO_2$, and $TiO_2$ are stacked on the metal layer 41 in this order among combinations of $Al_2O_3$, $SiO_2$, and $TiO_2$ in Table 1, the dielectric layer 42 has a highest reflectivity.

Although the dielectric layer 42 with a three-layer structure is used in the example, the same effects can be obtained, for example, even if the dielectric layer 42 with a five-layer structure is used.

The average refractive index nB and the total film thickness dB of the dielectric layer 42 with the three-layer structure are 2.05 and 125 nm, respectively.

Figure 18:
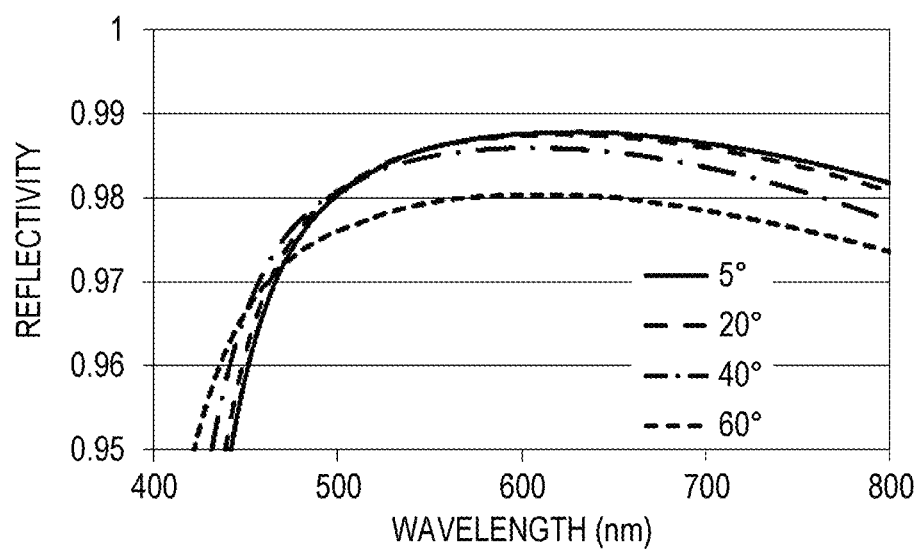
FIG. 18 is a chart showing a reflection spectrum of a light reflection film fabricated under the condition in Table 1.

FIG. 18 is a chart showing reflection spectra of a light reflection film fabricated under the condition in Table 1. The reflection spectrum of the light reflection film 40 shifts to the short wavelength side with an increase in angle of incidence. The wavelength $\lambda_0$ when the reflection spectrum of the light reflection film 40 at the angle of incidence of 0° is highest is 620 nm.

Examine a case using a YAG:Ce phosphor as a phosphor of the phosphor layer. A centroid wavelength ($\lambda_c$) of an emission spectrum of the YAG:Ce phosphor is 565 nm. Thus, the wavelength range of the wavelength $\lambda_0$ given by Expression (18) is 565 nm$<\lambda_0\leq$711 nm. The wavelength range of the wavelength $\lambda_0$ given by Expression (19) is 565 nm$<\lambda_0\leq$647 nm.

As for the above-described light reflection film 40, the wavelength $\lambda_0$ is 628 nm and falls within the wavelength range 565 nm$\leq\lambda_0\leq$647 nm.

As has been described above, the present disclosure includes devices described in the items below.

[Item 1]

An optical device including:

a light reflection film which includes a metal layer and a dielectric layer on the metal layer; and a phosphor layer which is located on the dielectric layer and which emits light by being excited by light from a light source, wherein the dielectric layer is located between the metal layer and the phosphor layer, a first wavelength, at which a reflectivity of light vertically incident on the light reflection film from the phosphor layer is highest, is longer than a centroid wavelength of an emission spectrum of the phosphor layer, the dielectric layer has a layered structure comprising a plurality of layers composed of at least two but no more than six layers, and refractive indexes of any two adjacent layers of the plurality of layers are different from each other.

[Item 2]

The optical device according to Item 1, in which a width of a wavelength region, in which the reflectivity of the light vertically incident on the light reflection film from the side of the phosphor layer is not less than 80%, is not less than 500 nm.

[Item 3]

The optical device according to Item 1 or 2, in which the first wavelength is longer than a second wavelength at which a reflectivity of light, incident on the light reflection film at an angle of incidence of 45° from the side of the phosphor layer, is highest, and a difference between the first wavelength and the second wavelength is not more than 70 nm.

[Item 4]

The optical device according to Item 3, in which the difference between the first wavelength and the second wavelength is not more than 40 nm.

[Item 5]

The optical device according to any one of Items 1 to 4, in which a thickness of the dielectric layer is not more than 400 nm.

[Item 6]
The optical device according to any one of Items 1 to 4, in which
a thickness of the dielectric layer is not more than 200 nm.

[Item 7]
The optical device according to any one of Items 1 to 6, in which
the following condition is met:

$$\lambda_c < \lambda_0 \leq \frac{1 + \left(\frac{n_A}{n_B}\right)^2}{2\sqrt{1 - \left(\frac{n_A}{n_B}\right)^2} - 1 + \left(\frac{n_A}{n_B}\right)^2} \lambda_c$$

where $n_A$ is a refractive index of the phosphor layer,
$n_B$ is an average refractive index of the dielectric layer,
$\lambda_0$ is the first wavelength, and
$\lambda_c$ is the centroid wavelength of the emission spectrum of the phosphor layer.

[Item 8]
The optical device according to any one of Items 1 to 6, in which
the following condition is met:

$$\lambda_0 \geq \left(2 - \sqrt{1 - \left(\frac{n_A \sin 10°}{n_B}\right)^2}\right) \lambda_c$$

where $n_A$ is a refractive index of the phosphor layer,
$n_B$ is an average refractive index of the dielectric layer,
$\lambda_0$ is the first wavelength, and
$\lambda_c$ is the centroid wavelength of the emission spectrum of the phosphor layer.

[Item 9]
The optical device according to Item 8, in which
the following condition is met:

$$\lambda_0 \leq \frac{\lambda_c}{\sqrt{1 - \left(\frac{n_A}{n_B}\right)^2}}$$

[Item 10]
The optical device according to any one of Items 1 to 6, in which
the following condition is met:

$$\lambda_c < \lambda_0 \leq \frac{\lambda_c}{\sqrt{1 - \left(\frac{n_A}{n_B}\right)^2}}$$

where $n_A$ is a refractive index of the phosphor layer,
$n_B$ is an average refractive index of the dielectric layer,
$\lambda_0$ is the first wavelength, and
$\lambda_c$ is the centroid wavelength of the emission spectrum of the phosphor layer.

[Item 11]
The optical device according to any one of Items 1 to 10, in which
the emission spectrum of the phosphor layer has at least one peak within a range of 400 nm to 800 nm.

[Item 12]
The optical device according to any one of Items 1 to 11, further including:
a substrate which supports the metal layer.

[Item 13]
The optical device according to any one of Items 1 to 12, in which
the metal layer contains at least one selected from the group consisting of silver, a silver alloy, aluminum, and an aluminum alloy.

[Item 14]
The optical device according to any one of Items 1 to 13, in which
the phosphor layer contains cerium-doped yttrium aluminum garnet.

[Item 15]
The optical device according to any one of Items 1 to 14, in which the light source includes a solid state laser.

[Item 16]
The optical device according to any one of Items 1 to 15, in which
the phosphor layer has a first surface facing the dielectric layer and a second surface opposite to the first surface, and
the light from the light surface is incident on the second surface of the phosphor layer.

[Item 17]
An optical device including:
a light reflection film which includes a metal layer and a dielectric layer on the metal layer; and
a phosphor layer which is located on the dielectric layer and which emits light by being excited by light from a light source, wherein
the dielectric layer is located between the metal layer and the phosphor layer,
a wavelength, at which a reflectivity of light vertically incident on the light reflection film from the phosphor layer is highest, is longer than a centroid wavelength of an optical spectrum, the optical spectrum being a combination of an emission spectrum of the light source and an emission spectrum of the phosphor layer,
the dielectric layer has a layered structure comprising a plurality of layers composed of at least two but no more than six layers, and refractive indexes of any two adjacent layers of the plurality of layers are different from each other.

An optical device according to an embodiment of the present disclosure can be used as a light emitting device or the like.

What is claimed is:
1. An optical device comprising:
a light reflection film which includes a metal layer and a dielectric layer on the metal layer; and
a phosphor layer which is located on the dielectric layer and which emits light by being excited by light from a light source, wherein
the dielectric layer is located between the metal layer and the phosphor layer,
a first wavelength, at which a reflectivity of light vertically incident on the light reflection film from the phosphor layer is highest, is longer than a centroid wavelength of an emission spectrum of the phosphor layer,
the dielectric layer has a layered structure comprising a plurality of layers composed of at least two but no more than six layers, and
refractive indexes of any two adjacent layers of the plurality of layers are different from each other.

2. The optical device according to claim 1, wherein
a width of a wavelength region, in which the reflectivity of the light vertically incident on the light reflection film from the side of the phosphor layer is not less than 80%, is not less than 500 nm.

3. The optical device according to claim 1, wherein
the first wavelength is longer than a second wavelength at which a reflectivity of light, incident on the light reflection film at an angle of incidence of 45° from the side of the phosphor layer, is highest, and
a difference between the first wavelength and the second wavelength is not more than 70 nm.

4. The optical device according to claim 3, wherein
the difference between the first wavelength and the second wavelength is not more than 40 nm.

5. The optical device according to claim 1, wherein
a thickness of the dielectric layer is not more than 400 nm.

6. The optical device according to claim 1, wherein
a thickness of the dielectric layer is not more than 200 nm.

7. The optical device according to claim 1, wherein
the following condition is met:

$$\lambda_c < \lambda_0 \leq \frac{1 + \left(\frac{n_A}{n_B}\right)^2}{2\sqrt{1 - \left(\frac{n_A}{n_B}\right)^2} - 1 + \left(\frac{n_A}{n_B}\right)^2} \lambda_c$$

where $n_A$ is a refractive index of the phosphor layer,
$n_B$ is an average refractive index of the dielectric layer,
$\lambda_0$ is the first wavelength, and
$\lambda_c$ is the centroid wavelength of the emission spectrum of the phosphor layer.

8. The optical device according to claim 1, wherein
the following condition is met:

$$\lambda_0 \geq \left(2 - \sqrt{1 - \left(\frac{n_A \sin 10°}{n_B}\right)^2}\right) \lambda_c$$

where $n_A$ is a refractive index of the phosphor layer,
$n_B$ is an average refractive index of the dielectric layer,
$\lambda_0$ is the first wavelength, and
$\lambda_c$ is the centroid wavelength of the emission spectrum of the phosphor layer.

9. The optical device according to claim 8, wherein
the following condition is met:

$$\lambda_0 \leq \frac{\lambda_c}{\sqrt{1 - \left(\frac{n_A}{n_B}\right)^2}}$$

10. The optical device according to claim 1, wherein
the following condition is met:

$$\lambda_c < \lambda_0 \leq \frac{\lambda_c}{\sqrt{1 - \left(\frac{n_A}{n_B}\right)^2}}$$

where $n_A$ is a refractive index of the phosphor layer,
$n_B$ is an average refractive index of the dielectric layer,
$\lambda_0$ is the first wavelength, and
$\lambda_c$ is the centroid wavelength of the emission spectrum of the phosphor layer.

11. The optical device according to claim 1, wherein the emission spectrum of the phosphor layer has at least one peak within a range of 400 nm to 800 nm.

12. The optical device according to claim 1, further comprising:
a substrate which supports the metal layer.

13. The optical device according to claim 1, wherein
the metal layer contains at least one selected from the group consisting of silver, a silver alloy, aluminum, and an aluminum alloy.

14. The optical device according to claim 1, wherein
the phosphor layer contains cerium-doped yttrium aluminum garnet.

15. The optical device according to claim 1, wherein
the light source includes a solid state laser.

16. The optical device according to claim 1, wherein
the phosphor layer has a first surface facing the dielectric layer and a second surface opposite to the first surface, and
the light from the light surface is incident on the second surface of the phosphor layer.

17. An optical device comprising:
a light reflection film which includes a metal layer and a dielectric layer on the metal layer; and
a phosphor layer which is located on the dielectric layer and which emits light by being excited by light from a light source, wherein
the dielectric layer is located between the metal layer and the phosphor layer,
a wavelength, at which a reflectivity of light vertically incident on the light reflection film from the phosphor layer is highest, is longer than a centroid wavelength of an optical spectrum, the optical spectrum being a combination of an emission spectrum of the light source and an emission spectrum of the phosphor layer,
the dielectric layer has a layered structure comprising a plurality of layers composed of at least two but no more than six layers, and refractive indexes of any two adjacent layers of the plurality of layers are different from each other.

* * * * *